US010638521B2

(12) United States Patent
Ogata et al.

(10) Patent No.: US 10,638,521 B2
(45) Date of Patent: Apr. 28, 2020

(54) ELECTRONIC DEVICE, COMMUNICATION METHOD, AND STORAGE MEDIUM STORING COMMUNICATION PROGRAM

(71) Applicant: OLYMPUS CORPORATION, Hachioji-shi, Tokyo (JP)

(72) Inventors: Yoshihisa Ogata, Hachioji (JP); Keito Fukushima, Mitaka (JP); Yoshiyuki Fukuya, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/405,513

(22) Filed: May 7, 2019

(65) Prior Publication Data

US 2019/0350014 A1    Nov. 14, 2019

(30) Foreign Application Priority Data

May 8, 2018 (JP) .................................. 2018-090145

(51) Int. Cl.
  *H04W 76/10* (2018.01)
  *H04W 8/00* (2009.01)
  *H04W 4/80* (2018.01)
(52) U.S. Cl.
  CPC ............. *H04W 76/10* (2018.02); *H04W 4/80* (2018.02); *H04W 8/005* (2013.01)

(58) Field of Classification Search
  CPC ....... H04W 76/10; H04W 4/80; H04W 8/005; H04W 4/23; H04W 76/14; H04B 3/544; H04B 7/18558
  See application file for complete search history.

(56) References Cited

U.S. PATENT DOCUMENTS

| | | | | |
|---|---|---|---|---|
| 2009/0116464 A1* | 5/2009 | Hunkeler | .......... | H04W 72/1231 370/338 |
| 2013/0339543 A1* | 12/2013 | Fall | .......... | H04L 69/16 709/233 |
| 2015/0271737 A1* | 9/2015 | Shin | .......... | H04H 20/16 455/41.2 |
| 2016/0095047 A1* | 3/2016 | Lee | .......... | H04W 4/80 370/328 |
| 2016/0164725 A1* | 6/2016 | Wu | .......... | H04L 12/40 713/168 |
| 2017/0011427 A1* | 1/2017 | Walden | .......... | G06Q 30/0261 |
| 2018/0098193 A1* | 4/2018 | Davenport | .......... | H04W 4/023 |
| 2018/0332563 A1* | 11/2018 | Sihlbom | .......... | H04W 48/10 |

FOREIGN PATENT DOCUMENTS

JP      2013118534 A    6/2013

* cited by examiner

*Primary Examiner* — Andrew Wendell
(74) *Attorney, Agent, or Firm* — Volpe and Koenig, P.C.

(57) ABSTRACT

An electronic device is capable of executing wireless communication. The electronic device includes a communication circuit and a control circuit. The communication circuit broadcast-transmits an advertise signal for causing the electronic device to be discovered by a plurality of other devices in the wireless communication. The control circuit changes advertise data included in the advertise signal in accordance with each of the other devices.

14 Claims, 13 Drawing Sheets

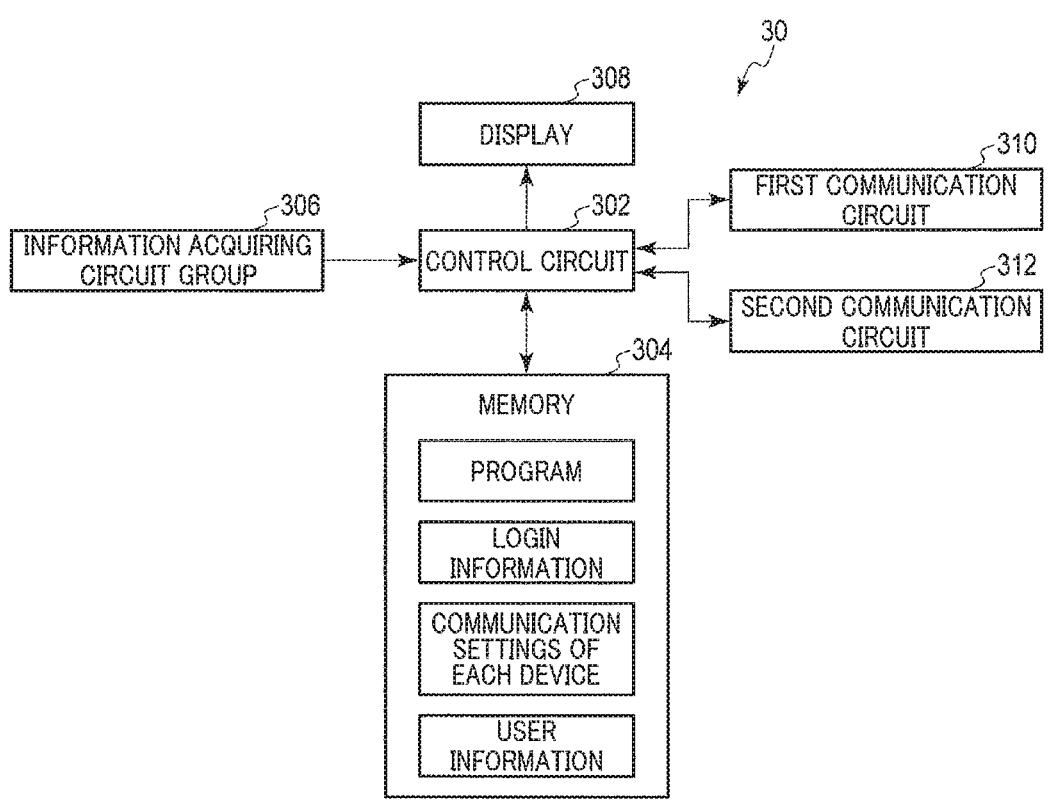
F I G. 4

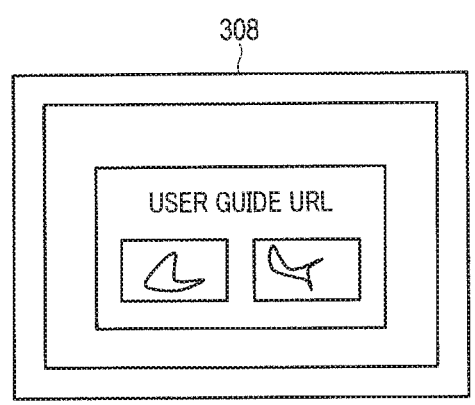
F I G. 11

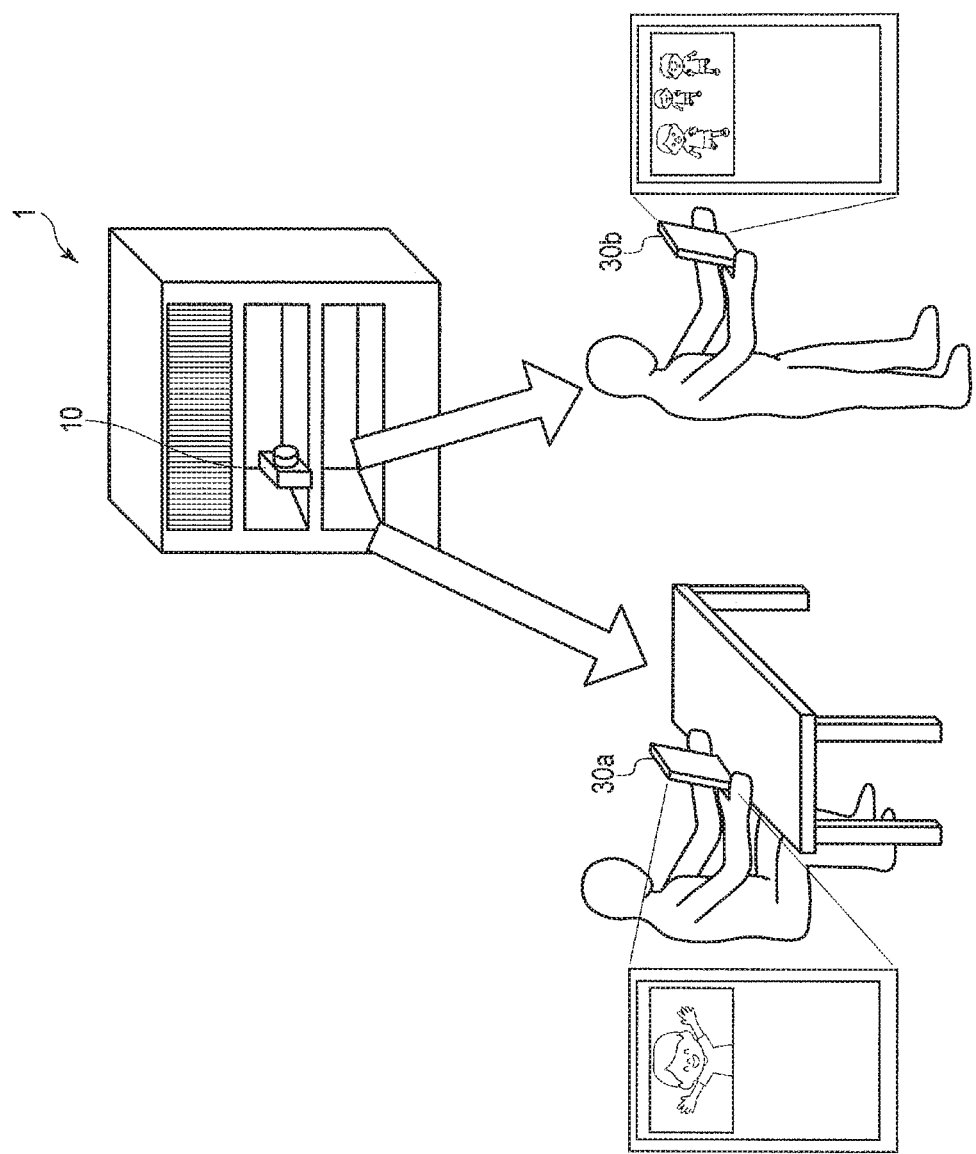
F I G. 12

ELECTRONIC DEVICE, COMMUNICATION METHOD, AND STORAGE MEDIUM STORING COMMUNICATION PROGRAM

CROSS-REFERENCE TO RELATED APPLICATIONS

This application is based upon and claims the benefit of priority from the prior Japanese Patent Applications No. 2018-090145, filed May 8, 2018, the entire contents of which are incorporated herein by reference.

FIELD

The present invention relates to an electronic device, a communication method by the electronic device, and a storage medium storing a communication program.

BACKGROUND

As one of low-power communication technologies, Bluetooth (trademark) Low Energy (BLE) is known. In BLE, communication is executed between an electronic device called "peripheral", and an electronic device called "central". In BLE, a signal with saved power, which is called "advertise signal", is broadcast-transmitted from the peripheral. Advertise data, which is included in the advertise signal, includes an ID called "Universally Unique Identifier (UUID)". The central recognizes the presence of the peripheral, by the UUID included in the received advertise signal. Then, where necessary, the central issues a request for communication connection to the peripheral. As a technology relating to this type of BLE, for example, a technology of Jpn. Pat. Appln. KOKAI Publication No. 2013-118534 is known.

When a plurality of centrals are present around the peripheral, the advertise signal can be received by each of the centrals.

SUMMARY

According to an embodiment, there is provided an electronic device capable of executing wireless communication, comprising: a communication circuit configured to broadcast-transmit an advertise signal for causing the electronic device to be discovered by a plurality of other devices in the wireless communication; and a control circuit configured to change advertise data included in the advertise signal in accordance with each of the other devices.

According to an embodiment, there is provided a communication method by an electronic device capable of executing wireless communication, comprising: broadcast-transmitting an advertise signal for causing the electronic device to be discovered by a plurality of other devices in the wireless communication; changing advertise data included in the advertise signal in accordance with each of the other devices; determining, by each of the other devices that received the advertise signal, whether communication with the electronic device is possible or not, in accordance with the advertise data; and issuing a request for the wireless communication from the other device to the electronic device, when it is determined that the communication with the electronic device is possible and when the communication with the electronic device is necessary.

According to an embodiment, there is provided a computer-readable non-transitory storage medium storing a communication program of an electronic device capable of executing wireless communication, the communication program causing a control circuit of the electronic device to execute: broadcast-transmitting an advertise signal for causing the electronic device to be discovered by a plurality of other devices in the wireless communication; and changing advertise data included in the advertise signal in accordance with each of the other devices.

Advantages of the embodiments will be set forth in the description which follows, and in part will be obvious from the description, or may be learned. The advantages may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments, and together with the general description given above and the detailed description of the embodiments given below, serve to explain the principles.

FIG. 4 is a block diagram illustrating a configuration of one example of a personal device.

FIG. 11 is a view illustrating a display example of information of a user guide.

FIG. 12 is a view illustrating a configuration of a communication system according to a modification of the embodiment.

DETAILED DESCRIPTION

Figure 1:
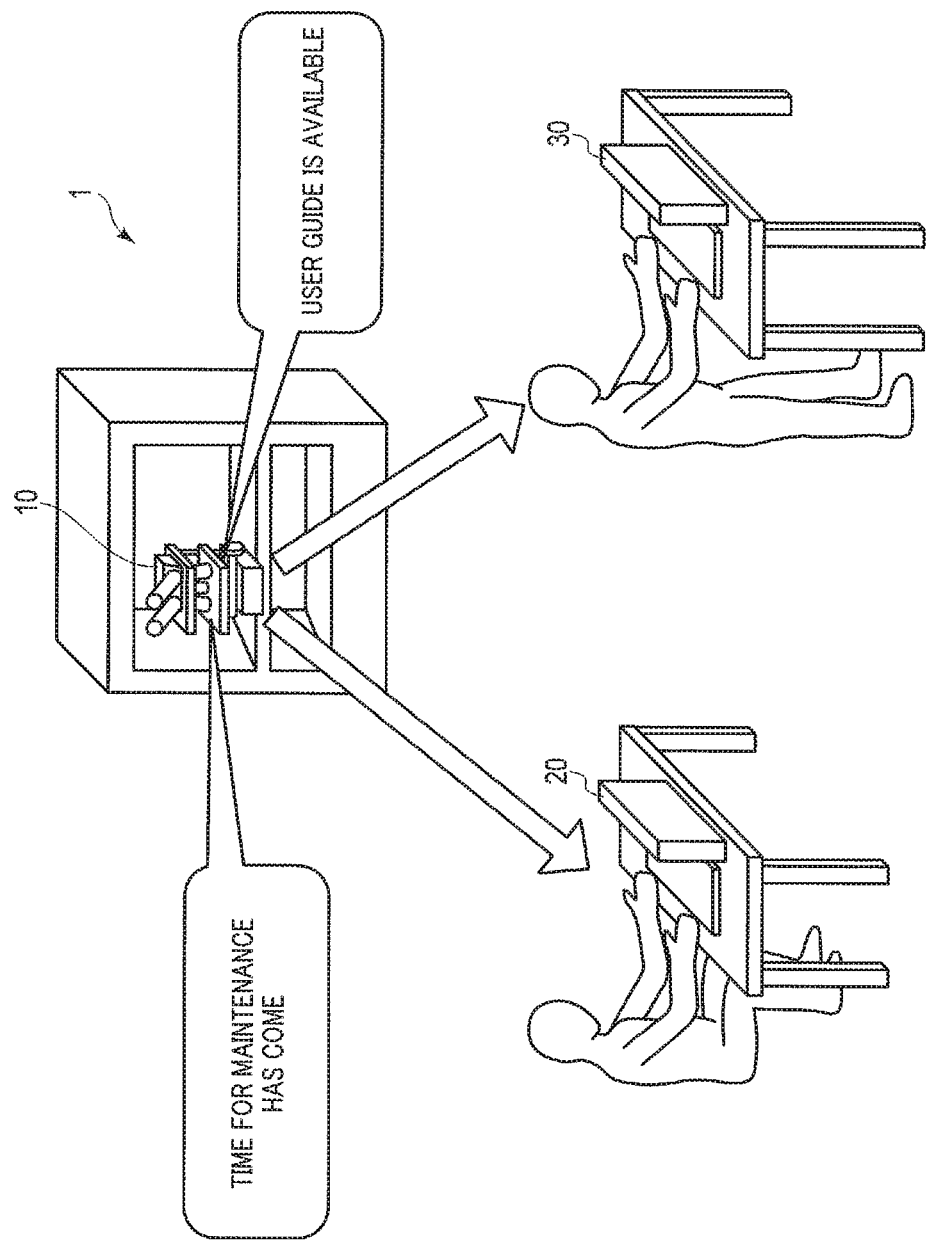
FIG. 1 is a view illustrating a configuration of a communication system according to one embodiment.

Hereinafter, an embodiment will be described with reference to the accompanying drawings. FIG. 1 is a view illustrating a configuration of a communication system according to one embodiment. As illustrated in FIG. 1, a communication system 1 includes an information acquiring device 10, a shared device 20 and a personal device 30. The information acquiring device 10 can communicate with the shared device 20 and personal device 30. In addition, FIG. 1 illustrates one shared device 20 and one personal device 30. However, the number of shared devices 20 may be two or more, and the number of personal devices 30 may be two or more.

The information acquiring device 10, which is an electronic device of "peripheral", is an electronic device for acquiring various pieces of information. For example, the information acquiring device 10 is an electronic device, such as a digital microscope, for acquiring information for observing a living body. The information acquiring device 10 transmits to the shared device 20 or personal device 30 the information which is acquired upon receiving a user's operation. In addition, the information acquiring device 10 may acquire information by remote control from the shared device 20 or personal device 30. The information acquiring device 10 may be shared by a plurality of users. Here, the information acquiring device 10 broadcast-transmits an advertise signal for communication with the shared device 20 or personal device 30. The advertise signal is a signal for causing the information acquiring device 10 to be discovered by an electronic device which becomes a communication counterpart of the information acquiring device 10. The advertise signal includes at least an ID for identifying the information acquiring device 10. Furthermore, in the present embodiment, an advertise signal appropriate for the shared device 20 and an advertise signal appropriate for the personal device 30 can be transmitted. As illustrated in FIG. 1, the advertise signal appropriate for the shared device 20 is, for example, an advertise signal which is intended to inform the shared device 20 that the time for maintenance of the information acquiring device 10 has come. On the other hand, the advertise signal appropriate for the personal device 30 is, for example, an advertise signal which is intended to inform the personal device 30 that the user guide of the information acquiring device 10 is available. In this manner, by varying the advertise signal between the devices, the information acquiring device 10 behaves as if to give advertisements individually to the shared device 20 and personal device 30. Specifically, the information acquiring device 10 gives an advertisement "the time for maintenance has come" to the shared device 20, while giving an advertisement "the user guide is available" to the personal device 30.

The shared device 20, which is an electronic device of "central", is an electronic device which is shared by a plurality of users. For example, the shared device 20 is a personal computer (PC) to which multiple users can log in. The shared device 20 manages the information acquiring device 10. Information can be transmitted from the information acquiring device 10 to the shared device 20. By receiving the advertise signal from the information acquiring device 10, the shared device 20 recognizes the presence of the information acquiring device 10. In addition, when communication with the information acquiring device 10 is necessary, the shared device 20 issues a request for communication connection to the information acquiring device 10.

The personal device 30, which is a device of "central", is an electronic device for exclusive use by a single user. For example, the personal device 30 is a personal computer (PC) to which a single user can log in. Information can also be transmitted from the information acquiring device 10 to the personal device 30. By receiving the advertise signal from the information acquiring device 10, the personal device 30 recognizes the presence of the information acquiring device 10. In addition, when communication with the information acquiring device 10 is necessary, the personal device 30 issues a request for communication connection to the information acquiring device 10.

Figure 2:
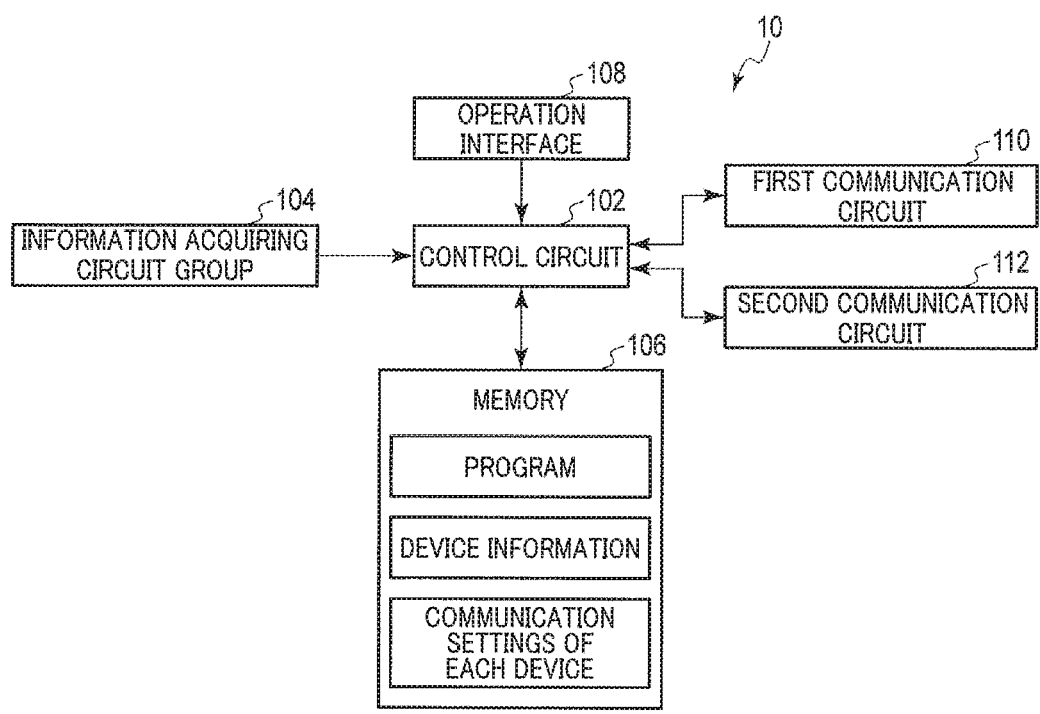
FIG. 2 is a block diagram illustrating a configuration of one example of an information acquiring device.

FIG. 2 is a block diagram illustrating a configuration of one example of the information acquiring device 10. The information acquiring device 10 includes a control circuit 102, an information acquiring circuit group 104, a memory 106, an operation interface 108, a first communication circuit 110, and a second communication circuit 112. The configuration of FIG. 2 is one example. Some elements may be omitted from the configuration of FIG. 2, and some elements may be added to the configuration of FIG. 2.

The control circuit 102 controls the operations of the elements of the information acquiring device 10. The control circuit 102 includes hardware such as a CPU, a GPU, an ASIC, an FPGA, and a main memory. The control circuit 102 may be composed of a single CPU, etc., or may be composed of a plurality of CPUs, etc. In addition, some functions of the control circuit 102 may be realized by software.

The information acquiring circuit group 104 is a circuit group for acquiring information such as images or sound. For example, when the information acquiring device 10 is a digital microscope, the information acquiring circuit group 104 includes an objective optical system, an image sensor and an image processing circuit. The objective optical system is an optical system provided on an object side of an observation target, and collects light from the object onto an image sensor. The image sensor converts the light, which is incident through the objective optical system, to an electric signal. The image processing circuit generates data of an image from the electric signal obtained by the image sensor. Besides, for example, when the information acquiring device 10 is a digital recorder, the information acquiring circuit group 104 includes a microphone and a sound processing circuit. The microphone converts sound produced around the information acquiring device 10 to an electric signal. The sound processing circuit generates data of sound from the electric signal obtained by the microphone. Here, the example in which the information acquiring device 10 is the digital microscope, and the example in which the information acquiring device 10 is the digital recorder, are illustrated. However, the information acquiring device 10 is not limited to the digital microscope or digital recorder.

The memory 106 is a memory such as a flash memory. The memory 106 stores various programs for use in the information acquiring device 10. In addition, in the present embodiment, the memory 106 stores device information. The device information is information of electronic devices which are communication counterparts of the information acquiring device 10. In the example of FIG. 1, the electronic devices, which are the communication counterparts, are the shared device 20 and personal device 30. The information of the electronic devices that are the communication counterparts is, for example, an ID allocated to each electronic device and a necessary password for communication connection. Further, in the present embodiment, in the memory 106, communication settings for each electronic device are stored. The details of the communication settings will be described later. Besides, the memory 106 may store information acquired by the information acquiring circuit group 104. Here, the number of memories 106 may be one, or two or more. Further, the memory 106 may not be incorporated in the information acquiring device 10. In other words, a part or the entirety of the memory 106 may be provided outside the information acquiring device 10.

The operation interface 108 is an operation interface for the user to operate the information acquiring device 10. For example, when the information acquiring device 10 is the digital microscope, the operation interface 108 includes an operation interface for focal adjustment, an operation interface for changing magnification, and an operation interface for moving a stage.

The first communication circuit 110 is, for example, a communication circuit for communication with low power consumption, such as Bluetooth Low Energy (BLE). On the other hand, the second communication circuit 112 is, for example, a communication circuit for large-capacity communication, such as Wi-Fi (trademark).

Figure 3:
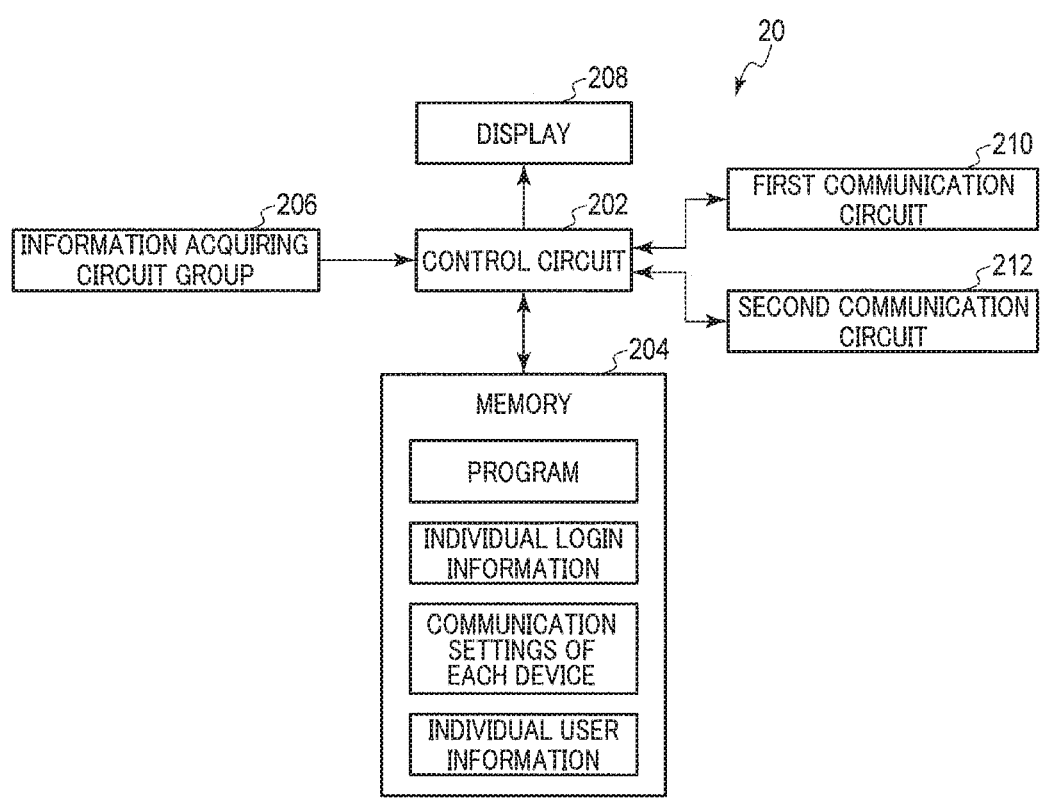
FIG. 3 is a block diagram illustrating a configuration of one example of a shared device.

FIG. 3 is a block diagram illustrating a configuration of one example of the shared device 20. One example of the shared device 20 is a PC. At this time, the shared device 20 includes a control circuit 202, a memory 204, an operation interface 206, a display 208, a first communication circuit 210, and a second communication circuit 212. Note that some elements may be omitted from the configuration of FIG. 3, and some elements may be added to the configuration of FIG. 3.

The control circuit 202 controls the operations of the elements of the shared device 20. The control circuit 202 includes hardware such as a CPU, a GPU, an ASIC, an FPGA, and a main memory. The control circuit 202 may be composed of a single CPU, etc., or may be composed of a plurality of CPUs, etc. In addition, some functions of the control circuit 202 may be realized by software.

The memory 204 is a flash memory, a hard disk drive, a solid state drive, or the like. The memory 204 stores various programs for use in the shared device 20. The memory 204 further stores login information of individual users who use the shared device 20. The login information includes, for example, an ID and a password. In addition, the memory 204 stores device information. The device information is information of electronic devices which are communication counterparts of the shared device 20. In the example of FIG. 1, the electronic devices, which are the communication counterparts, are the information acquiring device 10 and personal device 30. The memory 204 also stores user information. The user information is information of individual users who use the shared device 20. The user information is associated with the ID, and includes, for example, information such as the user's name, gender, age, and belonging department. Besides, the memory 204 may store information which is transmitted from the information acquiring device 10. Here, the number of memories 204 may be one, or two or more. Further, the memory 204 may not be incorporated in the shared device 20. In other words, a part or the entirety of the memory 204 may be provided outside the shared device 20.

The operation interface 206 is an operation interface for the user to operate the shared device 20. For example, when the shared device 20 is the PC, the operation interface 206 is an operation interface such as a keyboard, a mouse, etc. Further, the operation interface 206 may include various buttons, switches, etc. Besides, the operation interface 206 may be a touch panel, a microphone for sound input, etc.

The display 208 displays various images. The display 208 is a display such as a liquid crystal display or an organic EL display. The display 208 may not be provided, depending on the type of shared device 20.

The first communication circuit 210 is a communication circuit corresponding to the first communication circuit 110 of the information acquiring device 10. For example, the first communication circuit 210 is a communication circuit for communication with low power consumption, such as Bluetooth Low Energy (BLE). On the other hand, the second communication circuit 212 is a communication circuit corresponding to the second communication circuit 112 of the information acquiring device 10. For example, the second communication circuit 212 is a communication circuit for large-capacity communication, such as Wi-Fi.

FIG. 4 is a block diagram illustrating a configuration of one example of the personal device 30. The personal device 30 is, for example, a PC. At this time, the personal device 30 includes a control circuit 302, a memory 304, an operation interface 306, a display 308, a first communication circuit 310, and a second communication circuit 312. Note that some elements may be omitted from the configuration of FIG. 4, and some elements may be added to the configuration of FIG. 4.

The control circuit 302 controls the operations of the elements of the personal device 30. The control circuit 302 includes hardware such as a CPU, a GPU, an ASIC, an FPGA, and a main memory. The control circuit 302 may be composed of a single CPU, etc., or may be composed of a plurality of CPUs, etc. In addition, some functions of the control circuit 302 may be realized by software.

The memory 304 is a flash memory, a hard disk drive, a solid state drive, or the like. The memory 304 stores various programs for use in the personal device 30. The memory 304 further stores login information of a user who uses the personal device 30. The login information includes, for example, an ID and a password. In addition, the memory 304 stores device information. The device information is information of an electronic device which is a communication counterpart of the personal device 30. In the example of FIG. 1, the electronic device, which is the communication counterpart, is the information acquiring device 10. The memory 304 also stores user information. The user information is information of the user who uses the personal device 30. The user information is associated with the ID, and includes, for example, information such as the user's name, gender, age, and belonging department. Besides, the memory 304 may store information which is transmitted from the information acquiring device 10. Here, the number of memories 304 may be one, or two or more. Further, the memory 304 may not be incorporated in the personal device 30. In other words, a part or the entirety of the memory 304 may be provided outside the personal device 30.

The operation interface 306 is an operation interface for the user to operate the personal device 30. For example, when the personal device 30 is the PC, the operation interface 306 is an operation interface such as a keyboard, a mouse, etc. Further, the operation interface 306 may include various buttons, switches, etc. Besides, the operation interface 306 may be a touch panel, a microphone for sound input, etc.

The display 308 displays various images. The display 308 is a display such as a liquid crystal display or an organic EL display. The display 308 may not be provided, depending on the type of personal device 30.

The first communication circuit 310 is a communication circuit corresponding to the first communication circuit 110 of the information acquiring device 10. For example, the first communication circuit 310 is a communication circuit for communication with low power consumption, such as Bluetooth Low Energy (BLE). On the other hand, the second communication circuit 312 is a communication circuit corresponding to the second communication circuit 112 of the information acquiring device 10. For example, the second communication circuit 312 is a communication circuit for large-capacity communication, such as Wi-Fi.

Figure 5:
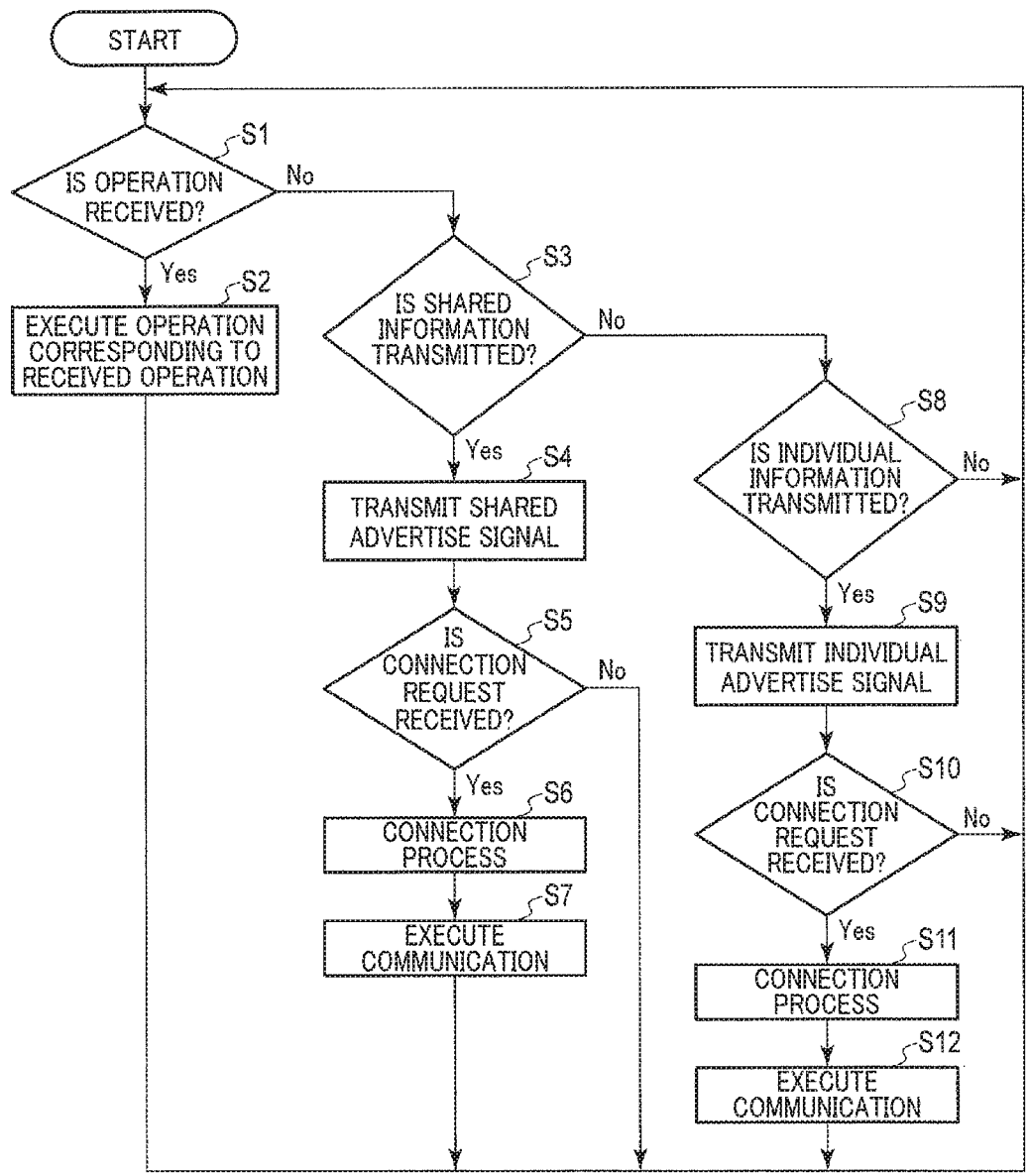
FIG. 5 is a flowchart illustrating an operation of the information acquiring device in the embodiment.

Next, the operation of the communication system of FIG. 1 will be described. FIG. 5 is a flowchart illustrating the operation of the information acquiring device 10. The operation of FIG. 5 is controlled by the control circuit 102. The operation of FIG. 5 is started, for example, when the information acquiring device 10 is powered on. In step S1, the control circuit 102 determines whether the operation interface 108 is operated by the user. In step S1, when it is determined that the operation interface 108 is operated by the user, the process advances to step S2. In step S1, when it is determined that the operation interface 108 is not operated by the user, the process advances to step S3.

In step S2, the control circuit 102 executes an operation corresponding to the operation interface 108 which is operated by the user. After the execution of the operation, the process returns to step S1.

In step S3, the control circuit 102 determines whether or not to transmit shared information. The shared information is information which is used in the shared device 20. Specifically, the shared information can be shared among the users of the shared device 20. The shared information includes, for example, information of necessity of maintenance of the information acquiring device 10. The information of necessity of maintenance as the shared information is determined to be transmitted, each time a predetermined maintenance period has passed. The maintenance period is, for example, three months. In this case, the control circuit 102 determines whether three months have passed since the previous maintenance. In addition, when the information acquiring device 10 is an electronic device that is shared, the shared information includes a use status of the information acquiring device 10. The use status is information which indicates, for example, that the information acquiring device 10 is not being used by the user. For example, the information of the use status as the shared information is determined to be transmitted, when the information acquiring device 10 is not being operated and when a period, in which the control circuit 102 executes none of various arithmetic processes, is continuing. In step S3, when it is determined that the shared information is to be transmitted, the process advances to step S4. In step S3, when it is determined that the shared information is not to be transmitted, the process advances to step S8.

In step S4, the control circuit 102 generates a shared advertise signal by referring to communication settings stored in the memory 106. Then, the control circuit 102 broadcast-transmits the shared advertise signal by using the first communication circuit 110. Thereafter, the process advances to step S5. The shared advertise signal is a signal including at least a part of the shared information. The shared advertise signal will be described later.

In step S5, the control circuit 102 determines whether a connection request from the shared device 20 is received or not. The advertise signal is only a signal for causing the information acquiring device 10 to be discovered by a nearby device. Specifically, the communication between the information acquiring device 10 and the shared device 20 is not executed by the mere reception of the advertisement signal by the shared device 20. The communication connection between the information acquiring device 10 and the shared device 20 is established by the information acquiring device 10 receiving a connection request from the shared device 20 that received the advertise signal. In step S5, the presence/absence of this connection request is determined. In step S5, when it is determined that the connection request is received, the process advances to step S6. In step S6, when it is determined that the connection request is not received, the process returns to step S1.

In step S6, the control circuit 102 executes a process for communication connection to the shared device 20. For example, the control circuit 102 executes authentication for the communication connection by the ID of the shared device 20 and the password for connection, which are transmitted from the shared device 20. When the authentication is correctly carried out, the communication connection is started. In this case, the process advances to step S7. Note that the process for communication connection in step S6 may be a process for communication connection by the first communication circuit 110, or may be a process for communication connection by the second communication circuit 112.

In step S7, the control circuit 102 executes communication with the shared device 20. For example, the control circuit 102 transmits information, which is requested by the shared device 20, to the shared device 20, or associates, upon a request from the shared device 20, the advertise signal and the shared device 20. Besides, when a request for transmission of information is issued from an unassociated shared device 20, the control circuit 102 may reject the request. The communication in step S7 may be executed by using the first communication circuit 110, or may be executed by using the second communication circuit 112. After the communication, the process returns to step S1.

In step S8, the control circuit 102 determines whether or not to transmit individual information. The individual information is information which is used in the personal device 30. Specifically, the individual information can be used by only the user of the personal device 30. The individual information includes, for example, information of a user guide of the information acquiring device 10. The information of the user guide as the individual information is determined to be transmitted periodically, for example, during a predetermined period from when the user registration of the personal device 30 is made. This predetermined period is, for example, one year. Specifically, after a period in which the user is assumed to become familiar with the method of using the information acquiring device 10, the information of the user guide as the individual information is not determined to be transmitted. Besides, the individual information may be transmitted only at a specified date and time, such as a birthday. In this case, in step S8, the control circuit 102 determines whether a preset specified date and time is reached. Then, the control circuit 102 determines that the individual information is to be transmitted, when the specified date and time is reached. In step S8, when it is determined that the individual information is to be transmitted, the process advances to step S9. In step S8, when it is determined that the individual information is not to be transmitted, the process returns to step S1.

In step S9, the control circuit 102 generates an individual advertise signal by referring to communication settings stored in the memory 106. Then, the control circuit 102 broadcast-transmits the individual advertise signal by using the first communication circuit 110. Thereafter, the process advances to step S10. The individual advertise signal is a signal including at least a part of the individual information. The individual advertise signal will be described later.

In step S10, the control circuit 102 determines whether a connection request from the personal device 30 is received or not. In step S10, when it is determined that the connection request is received, the process advances to step S11. In step S10, when it is determined that the connection request is not received, the process returns to step S1.

In step S11, the control circuit 102 executes a process for communication connection to the personal device 30. For example, the control circuit 102 executes authentication for the communication connection by the ID of the personal device 30 and the password for connection, which are transmitted from the personal device 30. When the authentication is correctly carried out, the communication connection is started. In this case, the process advances to step S12. Note that the process for communication connection in step S1b may be a process for communication connection by the first communication circuit 110, or may be a process for communication connection by the second communication circuit 112.

In step S12, the control circuit 102 executes communication with the personal device 30. For example, the control circuit 102 transmits information, such as images and sound, which is acquired by the information acquiring circuit group 104, to the personal device 30. In addition, the control circuit 102 associates, upon a request from the personal device 30, the advertise signal and the personal device 30. Besides, when a request for transmission of information is issued from an unassociated personal device 30, the control circuit 102 may reject the request. The communication in step S12 may be executed by using the first communication circuit 110, or may be executed by using the second communication circuit 112. After the communication, the process returns to step S1.

Figure 6:
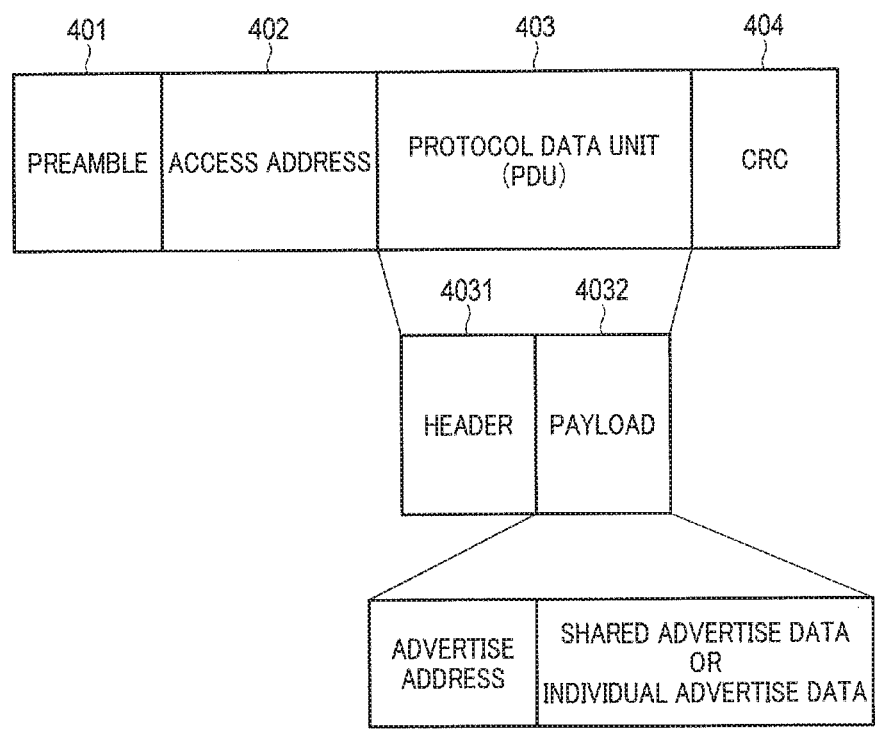
FIG. 6 is a view illustrating an example of the format of an advertise signal which is transmitted from the information acquiring device in the embodiment.

FIG. 6 is a view illustrating an example of the format of the advertise signal which is transmitted from the information acquiring device 10 in the embodiment. The format illustrated in FIG. 6 is stored in the memory 106 as one of communication settings. Here, FIG. 6 illustrates an example in which the technology of the present embodiment is applied to the advertise signal used in BLE communication. The technology of the present embodiment may not necessarily be applied to the advertise signal used in BLE communication.

As illustrated in FIG. 6, the unit of a transmission frame of the advertise signal includes a preamble 401, an access address 402, a protocol data unit (PDU) 403, and a cyclic redundancy check code (CRC) 404.

The preamble 401 is a signal part for taking a timing of a bit unit in the shared device 20 and personal device 30 which are reception devices of signals from the information acquiring device 10. The access address 402 is a signal part which is used for discriminating signals received in the shared device 20 and personal device 30 which are the reception devices. The access address 402 is a fixed value in the case of the advertise signal of BLE. The CRC 404 is a signal part for checking, in the shared device 20 and personal device 30 that are the reception devices, whether the advertise signal is properly received or not.

The PDU 403 is a signal part for a connection request from the information acquiring device 10. The PDU 403 includes a header 4031 and a payload 4032. The header 4031 includes information indicative of the kind of PDU, or the like. The payload 4032 is a net data part in data transmission, and stores data conforming to the format specified by the header 4031. In the present embodiment, data stored in the payload 4032 is different between the shared device 20 and the personal device 30. By the difference of the UUID included in the payload, it is preset which of the devices (shared device or personal device) responds. Specifically, the information acquiring device 10 may be an electronic device which is capable of executing wireless communication, and which includes a communication circuit configured to broadcast-transmit an advertise signal for causing the electronic device to be discovered by a plurality of other devices in the wireless communication, and a control circuit configured to change advertise data included in the advertise signal by changing an UUID of the advertise signal in accordance with each of the other devices. The UUID in the payload in the transmission frame of the advertise signal may be changed.

To begin with, shared advertise data and individual advertise data have different IDs. The ID is called "service UUID (Universally Unique Identifier)". Even in the case of the shared advertise signal for an identical shared device 20, the service UUID of the shared advertise signal at a time of transmitting the information of necessity of maintenance may be different from the service UUID of the shared advertise signal at a time of transmitting the information of a use status. In addition, service UUIDs may be allocated to the respective electronic devices which are communication targets of the information acquiring device 10. It should be noted, however, that the same service UUID may be used for a plurality of shared devices 20. This is because the shared information, which is transmitted to the shared devices 20, is assumed to be shared.

Further, each of the shared advertise data and the individual advertise data may include data other than the UUID. For example, the shared advertise data for transmitting the information of necessity of maintenance may include data indicating what kind of maintenance is necessary, and the shared advertise data for transmitting the information of the use status may include data indicating whether the use of the information acquiring device 10 is possible or not. Besides, data indicating the permission/prohibition of association between the advertise signal and other devices may be included, and the advertise data may be changed with respect to each associated device. In this manner, as much as possible data, which is allowed by the capacity of the payload 4032, may be included in the advertise signal. On the other hand, if the amount of data increases, power consumption for communication increases. Accordingly, actually, it is desirable to determine the advertise data, based on the trade-off between the power consumption and the content that is to be included in the advertise signal.

Furthermore, the content that is included in the advertise data may be updated in every predetermined period. In this case, for example, the control circuit 102 determines whether a predetermined period has passed since the transmission of the previous advertise signal. Then, when it is determined that the predetermined period has passed, the control circuit 102 changes the content that is included in the advertise data.

Figure 7:
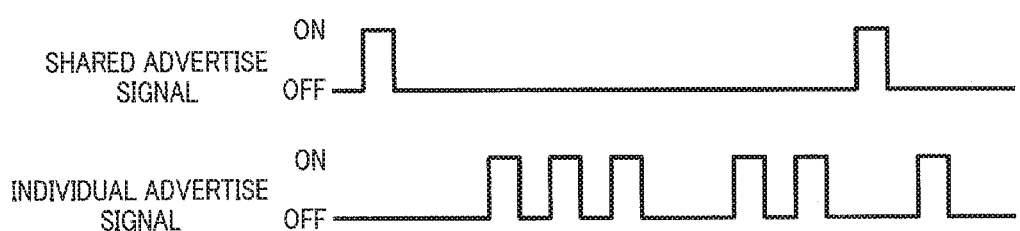
FIG. 7 is a timing chart illustrating an outline of transmission of the advertise signal in the embodiment.

FIG. 7 is a timing chart illustrating an outline of transmission of advertise signals in the embodiment. In FIG. 7, "ON" indicates that the transmission of the corresponding advertise signal is executed. On the other hand, "OFF" indicates that the transmission of the corresponding advertise signal is not executed. The advertise signal is transmitted at short intervals of, e.g. 100 milliseconds. Further, as illustrated in FIG. 7, in the present embodiment, the shared advertise signal and the individual advertise signal are transmitted in an exclusive manner. For example, when the transmission of the individual advertise signal becomes necessary while the shared advertise signal is being transmitted, the transmission of the individual advertise signal stands by until the transmission of the currently transmitted shared advertise signal is completed. Note that priority may be set on the advertise signal that is transmitted. For example, a higher priority may be set on an advertise signal which requires urgency, than on other advertise signals, so that the advertise signal which requires urgency may preferentially be transmitted. Besides, the frequency of transmission of the shared advertise signal or individual advertise signal may be changed. For example, an advertise signal with a high priority may be transmitted at intervals shorter than 100 milliseconds, and an advertise signal with a low priority may be transmitted at intervals longer than 100 milliseconds.

Here, as described above, the shared advertise signal is the advertise signal for the shared device 20, and the individual advertise signal is the advertise signal for the personal device 30. However, the shared advertise signal is also received by the personal device 30, and the individual advertise signal is also received by the shared device 20. Each of the shared device 20 and personal device 30 performs processing in such a manner as to ignore the advertise signal which is not related to the own device. Specifically, the electronic device, which can be provided here, includes a communication circuit configured to broadcast-transmit an advertise signal which causes the electronic device to be discovered by a plurality of other devices in wireless communication, and a control circuit configured to change advertise data, which is included in the advertise signal, in accordance with each of the other devices, and configured to execute transmission control by varying the transmission cycles of the advertise signals corresponding to these devices.

The information acquiring device 10 in the present embodiment changes the advertise data in accordance with a counterpart to which a connection request is issued. The advertise signal including the thus changed advertise data may be not only a signal which merely causes the presence of the information acquiring device 10 to be recognized by nearby electronic devices, but may also become a signal appropriate for each individual electronic device.

Figure 8:
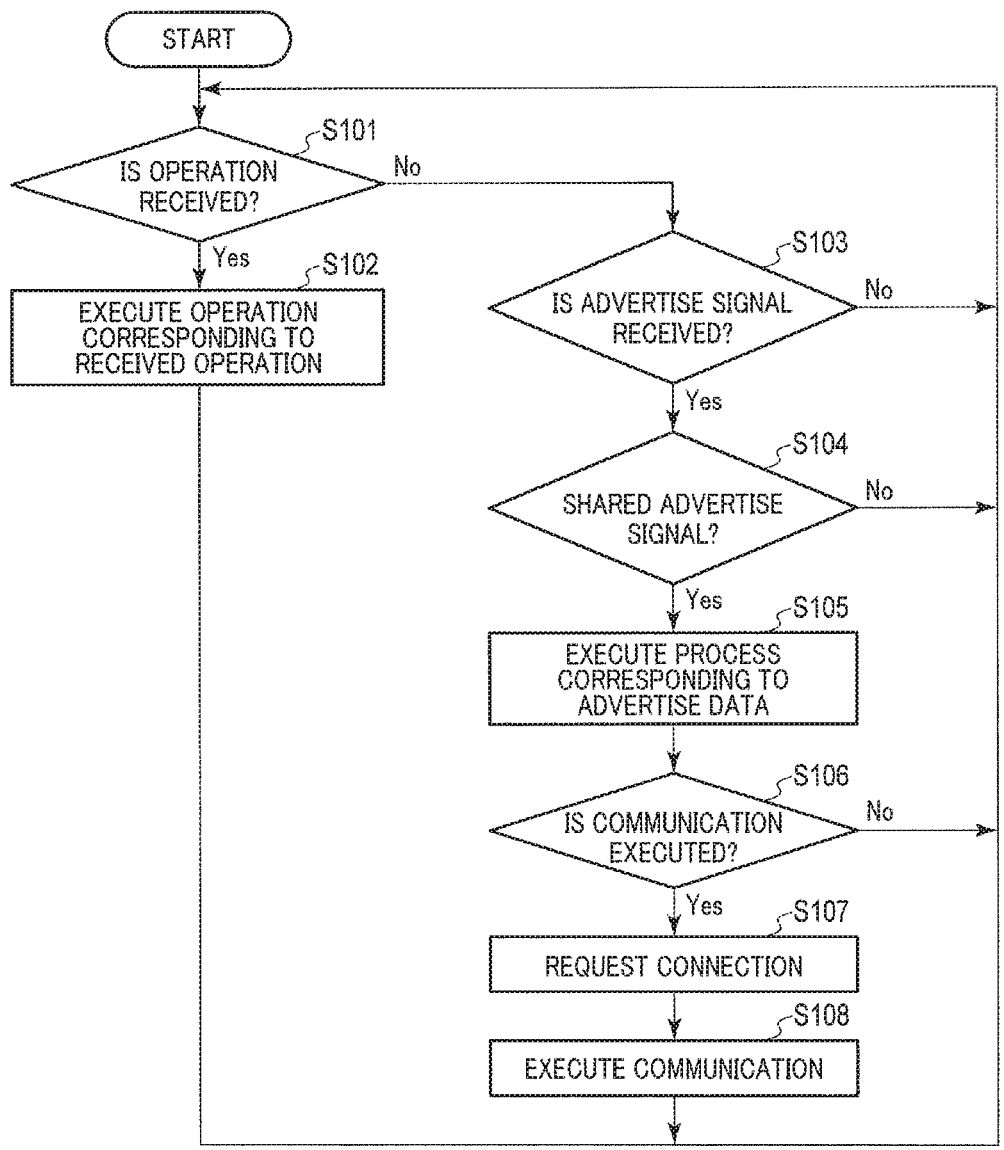
FIG. 8 is a flowchart illustrating an operation of the shared device in the embodiment.

FIG. 8 is a flowchart illustrating the operation of the shared device 20. The operation of FIG. 8 is controlled by the control circuit 202. The operation of FIG. 8 is started, for example, when the shared device 20 is powered on. In step S101, the control circuit 202 determines whether the operation interface 206 is operated by the user. In step S101, when it is determined that the operation interface 206 is operated by the user, the process advances to step S102. In step S101, when it is determined that the operation interface 206 is not operated by the user, the process advances to step S103.

In step S102, the control circuit 202 executes an operation corresponding to the operation interface 206 which is operated by the user. After the execution of the operation, the process returns to step S101.

In step S103, the control circuit 202 determines whether the advertise signal is received or not. For example, the control circuit 202 can determine that the advertise signal is received, based on the access address 402 included in the received signal. In step S103, when it is determined that the advertise signal is received, the process advances to step S104. In step S103, when it is determined that the advertise signal is not received, the process returns to step S101.

In step S104, the control circuit 202 determines whether the received advertise signal is the shared advertise signal or not. For example, based on the service UUID included in the received signal, the control circuit 202 can determine that the received advertise signal is the shared advertise signal. In step S104, when it is determined that the received advertise signal is the shared advertise signal, the process advances to step S105. In step S104, when it is determined that the received advertise signal is not the shared advertise signal, the process returns to step S101. In other words, when the individual advertise signal is received, the process returns to step S101.

Figure 9A:
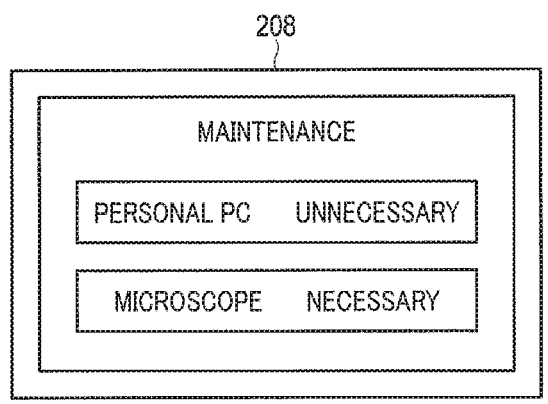
FIG. 9A is a view illustrating a display example of information of maintenance.
Figure 9B:
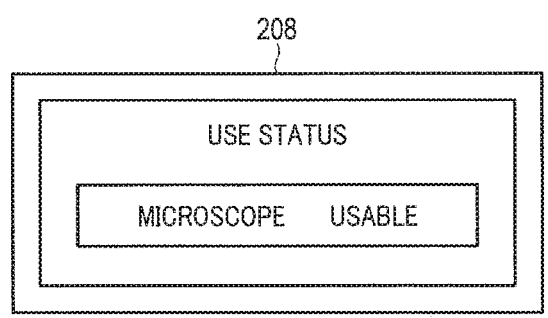
FIG. 9B is a view illustrating a display example of a use status.

In step S105, the control circuit 202 executes a process corresponding to the shared advertise data included in the shared advertise signal. Thereafter, the process advances to step S106. When the control circuit 202 determines, based on the service UUID included in the received signal, that the shared advertise data includes the information of necessity of maintenance, the control circuit 202 causes the display 208 to display a display screen indicating that the maintenance of the information acquiring device 10 is necessary, for example, as illustrated in FIG. 9A. In addition, when the control circuit 202 determines, based on the service UUID included in the received signal, that the shared advertise data includes the information of the use status, the control circuit 202 causes the display 208 to display a display screen indicating that the information acquiring device 10 is usable, for example, as illustrated in FIG. 9B. Note that the shared device 20 may manage the status of a reservation for use of the information acquiring device 10. In this case, the shared device 20 may also display, on the display 208, for example, a time slot or the like in which the information acquiring device 10 can be used, based on the status of the reservation for use, which the shared device 20 itself manages, and the information of the use status included in the shared advertise data.

In step S106, the control circuit 202 determines whether communication with the information acquiring device 10 is necessary or not. For example, communication with the information acquiring device 10 is determined to be necessary, when additional information is needed to the information included in the shared advertise data from the information acquiring device 10, or when communication with the information acquiring device 10 is instructed by the user. In step S106, when it is determined that the communication with the information acquiring device 10 is necessary, the process advances to step S107. In step S106, when it is determined that the communication with the information acquiring device 10 is not necessary, the process returns to step S101.

In step S107, the control circuit 202 requests a communication connection to the information acquiring device 10 by transmitting the ID and password to the information acquiring device 10 for the purpose of authentication. After the communication connection is completed, the process advances to step S108. Note that the connection request in step S107 may be a process for the first communication circuit 210, or may be a process for the second communication circuit 212.

In step S108, the control circuit 202 executes communication with the information acquiring device 10. For example, the control circuit 202 requests the information acquiring device 10 to transmit various pieces of information, such as the detailed information of maintenance, and the information the acquisition of which is requested by the user. In addition, when the data, which is included in the advertise data and indicates the permission/prohibition of association between the advertise signal and other devices, indicates "permission", the control circuit 202 may request the information acquiring device 10 to associate the advertise signal and other devices. The communication in step S108 may be executed by using the first communication circuit 210, or may be executed by using the second communication circuit 212. After the communication, the process returns to step S101.

Figure 10:
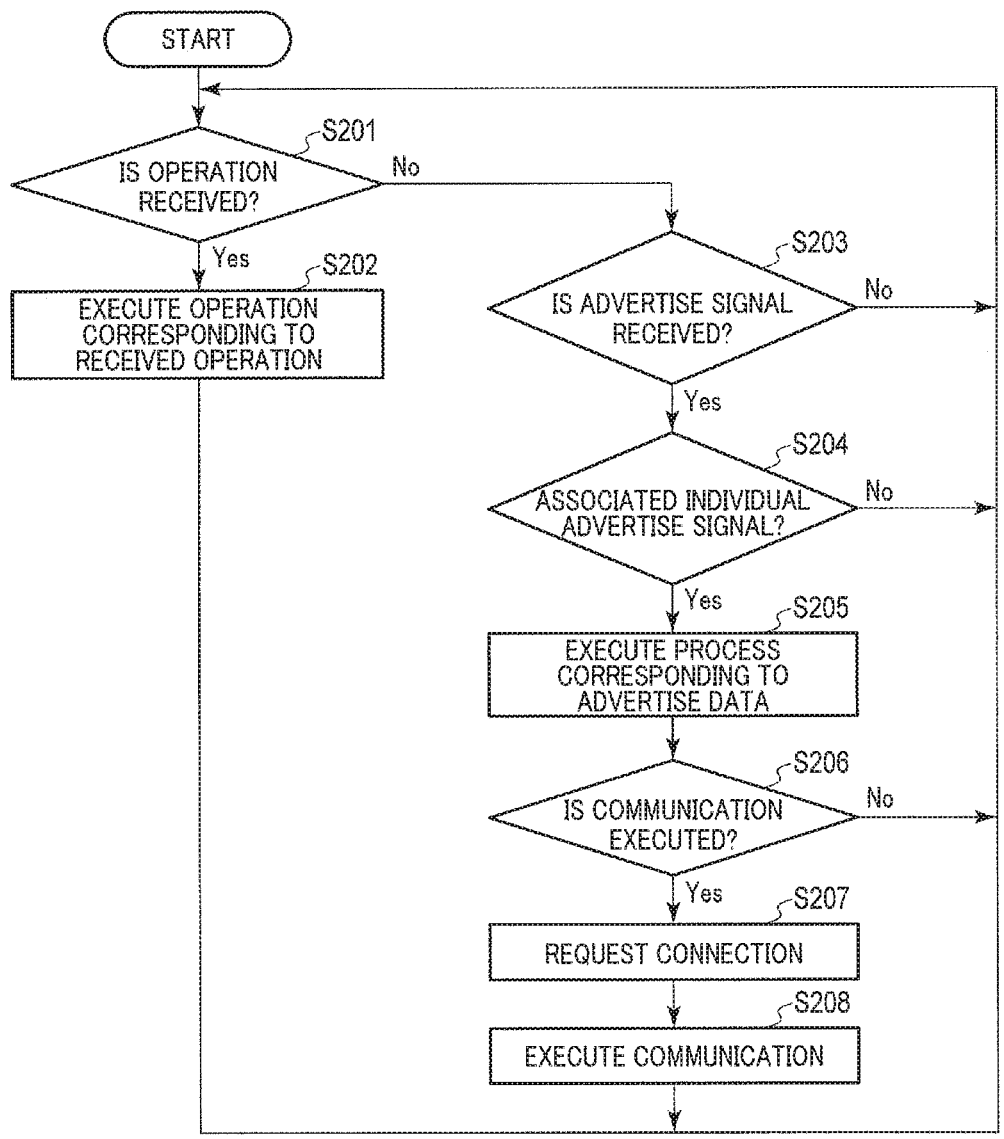
FIG. 10 is a flowchart illustrating an operation of the personal device.

FIG. 10 is a flowchart illustrating the operation of the personal device 30. The operation of FIG. 10 is controlled by the control circuit 302. The operation of FIG. 10 is started, for example, when the personal device 30 is powered on. In step S201, the control circuit 302 determines whether the operation interface 306 is operated by the user. In step S201, when it is determined that the operation interface 306 is operated by the user, the process advances to step S202. In step S201, when it is determined that the operation interface 306 is not operated by the user, the process advances to step S203.

In step S202, the control circuit 302 executes an operation corresponding to the operation interface 306 which is operated by the user. After the execution of the operation, the process returns to step S201.

In step S203, the control circuit 302 determines whether the advertise signal is received or not. For example, the control circuit 302 can determine that the advertise signal is received, based on the access address 402 included in the received signal. In step S203, when it is determined that the advertise signal is received, the process advances to step S204. In step S203, when it is determined that the advertise signal is not received, the process returns to step S201.

In step S204, the control circuit 302 determines whether the received advertise signal is the individual advertise signal associated with the own device. For example, based on the service UUID included in the received signal, the control circuit 302 can determine that the received advertise signal is the individual advertise signal associated with the own device. In step S204, when it is determined that the received advertise signal is the individual advertise signal associated with the own device, the process advances to step S205. In step S204, when it is determined that the received advertise signal is not the individual advertise signal associated with the own device, the process returns to step S201. In other words, when the shared advertise signal is received, the process returns to step S201. Besides, even when the individual advertise signal is received, if the individual advertise signal is an advertise signal that is not associated with the own device, the process also returns to step S201.

In step S205, the control circuit 302 executes a process corresponding to the individual advertise data included in the individual advertise signal. Thereafter, the process advances to step S206. When the control circuit 302 determines, based on the service UUID included in the received signal, that the individual advertise data includes the information of the user guide, the control circuit 302 causes the display 308 to display the URL of the user guide of the information acquiring device 10, for example, as illustrated in FIG. 11.

In step S206, the control circuit 302 determines whether communication with the information acquiring device 10 is necessary or not. For example, communication with the information acquiring device 10 is determined to be necessary, when additional information is needed to the information included in the individual advertise data from the information acquiring device 10, or when communication with the information acquiring device 10 is instructed by the user. In step S206, when it is determined that the communication with the information acquiring device 10 is necessary, the process advances to step S207. In step S206, when it is determined that the communication with the information acquiring device 10 is not necessary, the process returns to step S201.

In step S207, the control circuit 302 requests a communication connection to the information acquiring device 10 by transmitting the ID and password to the information acquiring device 10 for the purpose of authentication. After the communication connection is completed, the process advances to step S208. Note that the connection request in step S207 may be a process for the first communication circuit 310, or may be a process for the second communication circuit 312.

In step S208, the control circuit 302 executes communication with the information acquiring device 10. For example, the control circuit 302 requests the information acquiring device 10 to transmit various pieces of information, such as the information the acquisition of which is requested by the user. In addition, when the data, which is included in the advertise data and indicates the permission/ prohibition of association between the advertise signal and other devices, indicates "permission", the control circuit 302 may request the information acquiring device 10 to associate the advertise signal and other devices. The communication in step S208 may be executed by using the first communication circuit 310, or may be executed by using the second communication circuit 312. After the communication, the process returns to step S201.

As described above, in the present embodiment, the content of the advertise data is varied between the shared device 20 and personal device 30. Thereby, each advertise data can be optimized in accordance with the electronic device of the communication counterpart. In this manner, in the present embodiment, in the communication system in which a plurality of centrals are present around a peripheral, the advertise signal appropriate for each central is transmitted.

[Modification]

A modification of the embodiment will now be described. The above-described system of FIG. 1 is a system including the information acquiring device 10 which is the electronic device of the peripheral, and the shared device 20 and personal device 30 which are the electronic devices of the plural centrals having different attributes. On the other hand, the plural centrals may all be personal devices. For example, the technology of the present embodiment may be applied to a communication system illustrated in FIG. 12. The communication system 1 illustrated in FIG. 12 includes the information acquiring device 10, a personal device 30a and a personal device 30b. The information acquiring device 10 can communicate with the personal device 30a and personal device 30b. In FIG. 12, the number of personal devices may be three or more.

Like the above-described embodiment, the information acquiring device 10 that is the electronic device of the peripheral is an electronic device for acquiring various pieces of information. In the modification, for example, the information acquiring device 10 is a digital camera. In the present modification, an advertise signal appropriate for the personal device 30a and an advertise signal appropriate for the personal device 30b can be individually transmitted. In the modification, the advertise signal appropriate for the personal device 30a is, for example, an advertise signal including a transfer presetting of an image relating to the user of the personal device 30a. On the other hand, the advertise signal appropriate for the personal device 30b is, for example, an advertise signal including a transfer presetting of an image relating to the user of the personal device 30b. In this manner, by the transmission of the advertise signals including transfer presettings of different images, the different images are transferred to the personal device 30a and personal device 30b. Note that the configuration of FIG. 2 can basically be applied to the configuration of the information acquiring device 10. However, the circuits included in the information acquiring circuit group 104 and the operation interfaces included in the operation interface 108 may be different from those in FIG. 2. For example, when the information acquiring device 10 is a digital camera, the information acquiring circuit group 104 may include an optical system, an image sensor and an image processing circuit for photographing images. In addition, the operation interface 108 may include a release button, etc.

The personal devices 30*a* and 30*b*, which are electronic devices of centrals, are electronic devices for exclusive use by different users. For example, the personal devices 30*a* and 30*b* are smartphones. The personal devices 30*a* and 30*b* recognize the presence of the information acquiring device 10 by receiving advertise signals from the information acquiring device 10. In addition, when communication with the information acquiring device 10 is necessary, the personal devices 30*a* and 30*b* issue requests for communication connection to the information acquiring device 10. Note that the configuration of FIG. 4 can basically be applied to the configurations of the personal devices 30*a* and 30*b*. Besides, the personal devices 30*a* and 30*b* may include necessary circuits as smartphones, such as mobile phone communication circuits.

Figure 13:
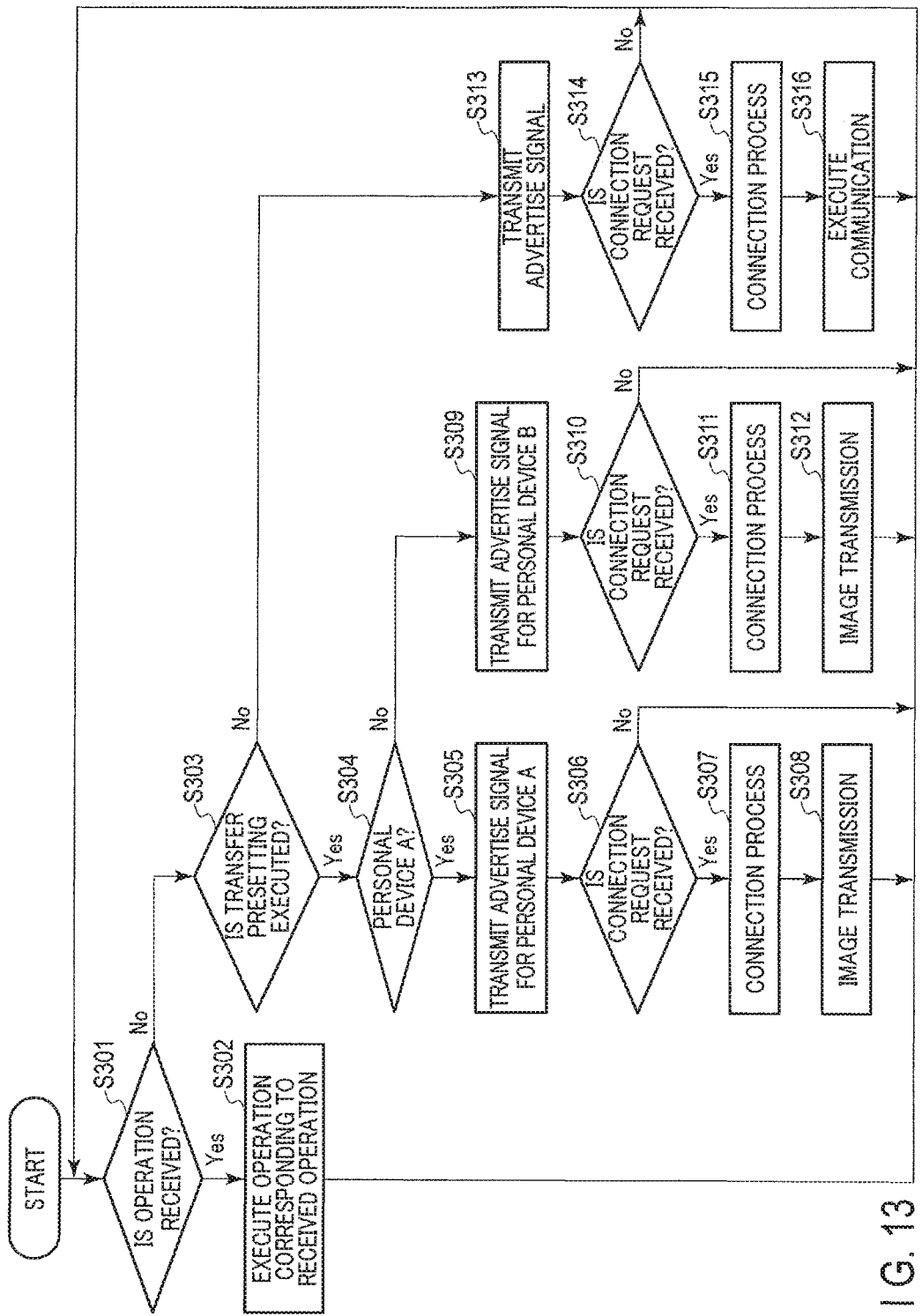
FIG. 13 is a flowchart illustrating an operation of an information acquiring device in the modification of the embodiment.

Next, the operation of the communication system of FIG. 12 will be described. FIG. 13 is a flowchart illustrating the operation of the information acquiring device 10. The operation of FIG. 13 is controlled by the control circuit 102. Hereinafter, when necessary, the personal device 30*a* is described as "personal device A", and the personal device 30*b* is described as "personal device B". In step S301, the control circuit 102 determines whether the operation interface 108 is operated by the user. In step S301, when it is determined that the operation interface 108 is operated by the user, the process advances to step S302. In step S301, when it is determined that the operation interface 108 is not operated by the user, the process advances to step S303.

In step S302, the control circuit 102 executes an operation corresponding to the operation interface 108 which is operated by the user. For example, the control circuit 102 executes the operation of photography, in response to the pressing of the release button. Images captured by the photography are classified on a user-by-user basis, and stored in the memory 106. After the execution of the operation, the process returns to step S301.

In step S303, the control circuit 102 determines whether a transfer presetting is executed or not. The transfer presetting is a presetting for transferring images stored in the memory 106 to the corresponding user's personal device. When the presetting is executed, images are automatically transferred, for example, at a designated time. The transfer presetting is executed by, for example, an operation of the operation interface 108 by the user, or an operation on an application of the personal device A or personal device B. In step S303, when it is determined that the transfer presetting is executed, the process advances to step S304. In step S303, when it is determined that the transfer presetting is not executed, the process advances to step S313. Note that the determination in step S303 may be executed only in a specific time slot such as midnight. The reason for this is that the transfer of images is a process which does not need to be executed while being confirmed by the user. In the above-described embodiment, too, the determination as to whether or not to transmit the shared information and the determination as to whether or not to transmit the individual information may be executed only in a specific time slot.

In step S304, the control circuit 102 determines whether the transfer presetting is executed for the personal device A or not. In step S304, when it is determined that the transfer presetting is executed for the personal device A, the process advances to step S305. In step S304, when it is determined that the transfer presetting is not executed for the personal device A, i.e. the transfer presetting is executed for the personal device B, the process advances to step S309.

In step S305, the control circuit 102 broadcast-transmits the advertise signal for the personal device A, by using the first communication circuit 110. Thereafter, the process advances to step S306. The advertise signal for the personal device A includes advertise data including a service UUID which is indicative of the transfer presetting of the personal device A.

In step S306, the control circuit 102 determines whether a connection request from the personal device A is received or not. In step S306, when it is determined that the connection request is received, the process advances to step S307. In step S306, when it is determined that the connection request is not received, the process returns to step S301.

In step S307, the control circuit 102 executes a process for communication connection to the personal device A. For example, the control circuit 102 executes authentication for the communication connection by the ID of the personal device A and the password for connection, which are transmitted from the personal device A. When the authentication is correctly carried out, the communication connection is started. In this case, the process advances to step S308. Note that the process for communication connection in step S307 is a process for communication connection by the second communication circuit 112. The reason for this is that the transfer of images requires high-speed, large-capacity communication.

In step S308, the control circuit 102 executes communication with the personal device A. The control circuit 102 transmits to the personal device A those images of the user of the personal device A, for which the transfer presetting is executed, among the images stored in the memory 106. The communication in step S308 is executed by using the second communication circuit 112. After the communication, the process returns to step S301.

In step S309, the control circuit 102 broadcast-transmits the advertise signal for the personal device B, by using the first communication circuit 110. Thereafter, the process advances to step S310. The advertise signal for the personal device B includes advertise data including a service UUID which is indicative of the transfer presetting of the personal device B.

In step S310, the control circuit 102 determines whether a connection request from the personal device B is received or not. In step S310, when it is determined that the connection request is received, the process advances to step S311. In step S310, when it is determined that the connection request is not received, the process returns to step S301.

In step S311, the control circuit 102 executes a process for communication connection to the personal device B. For example, the control circuit 102 executes authentication for the communication connection by the ID of the personal device B and the password for connection, which are transmitted from the personal device B. When the authentication is correctly carried out, the communication connection is started. In this case, the process advances to step S312. Note that the process for communication connection in step S311 is a process for communication connection by the second communication circuit 112.

In step S312, the control circuit 102 executes communication with the personal device B. The control circuit 102 transmits to the personal device B those images of the user of the personal device B, for which the transfer presetting is executed, among the images stored in the memory 106. The communication in step S312 is executed by using the second communication circuit 112. After the communication, the process returns to step S301.

In step S313, the control circuit 102 broadcast-transmits a normal advertise signal by using the first communication circuit 110. Thereafter, the process advances to step S314. The normal advertise signal includes advertise data which does not include a service UUID for a specific electronic device. Note that the shared advertise signal may be used as the normal advertise signal.

In step S314, the control circuit 102 determines whether a connection request from any one of the electronic devices is received or not. In step S314, when it is determined that the connection request is received, the process advances to step S315. In step S314, when it is determined that the connection request is not received, the process returns to step S301.

In step S315, the control circuit 102 executes a process for communication connection to the electronic device from which the connection request is received. For example, the control circuit 102 executes authentication for the communication connection by the ID of the electronic device and the password for connection, which are transmitted from the electronic device from which the connection request is received. When the authentication is correctly carried out, the communication connection is started. In this case, the process advances to step S316. Note that the process for communication connection in step S315 may be a process for communication connection by the first communication circuit 110, or may be a process for communication connection by the second communication circuit 112.

In step S316, the control circuit 102 executes communication with the electronic device from which the connection request is received. For example, the control circuit 102 associates, upon a request from the personal device, the advertise signal and the personal device. Besides, when a request for transmission of information is issued from an unassociated personal device, the control circuit 102 may reject the request. After the communication, the process returns to step S301.

In the present embodiment, service UUIDs are allocated to the personal devices, respectively. However, an identical service UUID may be used, and information for identifying the personal device may be set in the advertise data. For this purpose, such a system configuration or service configuration may be adopted that the control circuit 102 sets information individually for the personal devices, or the user requests setting in the shop when the user purchases the information acquiring device 10, or requests setting or recording of information by sending setting information to the manufacturer before or after the purchase. Alternatively, the user may perform settings on the information acquiring device 10 by various input methods.

Figure 14:
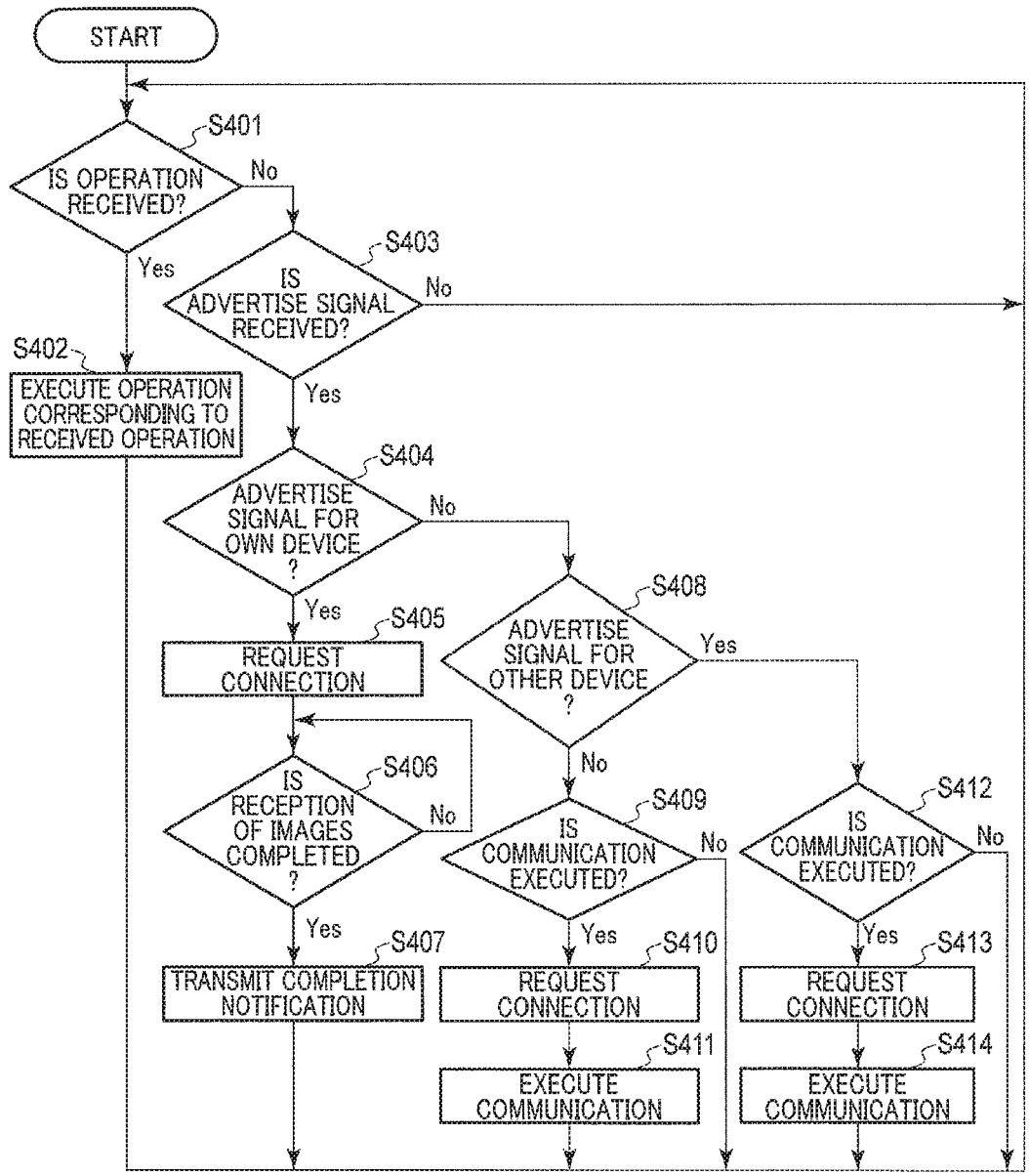
FIG. 14 is a flowchart illustrating an operation of a personal device in the modification of the embodiment.

FIG. 14 is a flowchart illustrating the operation of the personal device. The operation of FIG. 14 is applied to either the personal device 30a or the personal device 30b. The operation of FIG. 14 is controlled by the control circuit 302. The operation of FIG. 14 is started, for example, when the personal device 30a or 30b is powered on. In step S401, the control circuit 302 determines whether the operation interface 306 is operated by the user. In step S401, when it is determined that the operation interface 306 is operated by the user, the process advances to step S402. In step S401, when it is determined that the operation interface 306 is not operated by the user, the process advances to step S403.

In step S402, the control circuit 302 executes an operation corresponding to the operation interface 306 which is operated by the user. After the execution of the operation, the process returns to step S401.

In step S403, the control circuit 302 determines whether the advertise signal is received or not. For example, the control circuit 302 can determine that the advertise signal is received, based on the access address 402 included in the received signal. In step S403, when it is determined that the advertise signal is received, the process advances to step S404. In step S403, when it is determined that the advertise signal is not received, the process returns to step S401.

In step S404, the control circuit 302 determines whether the received advertise signal is the advertise signal associated with the own device. For example, based on the service UUID included in the received signal, the control circuit 302 can determine that the received advertise signal is the advertise signal associated with the own device. In step S404, when it is determined that the received advertise signal is the advertise signal associated with the own device, the process advances to step S405. In step S404, when it is determined that the received advertise signal is not the advertise signal associated with the own device, the process advances to step S408.

In step S405, the control circuit 302 requests a communication connection to the information acquiring device 10 by transmitting the ID and password to the information acquiring device 10 for the purpose of image transfer. After the communication connection is completed, the process advances to step S406. Note that the connection request in step S405 is a process for the second communication circuit 312. In addition, the connection request for image transfer may be issued only at a time that is designated in advance by the user. When such designation of time is executed, the process of steps S405 to S407 is skipped while the designated time is not reached.

In step S406, the control circuit 302 determines whether the reception of images is completed or not. For example, when all images, the transfer of which is preset, have been received without an error, it is determined that the reception of images is completed. In step S406, the process stands by until the completion of reception of images is determined. In step S406, when the completion of reception of images is determined, the process advances to step S407.

In step S407, the control circuit 302 transmits a completion notification to the information acquiring device 10, for example, by using the second communication circuit 312. Thereafter, the process returns to step S401.

In step S408, the control circuit 302 determines whether the received advertise signal is an advertise signal associated with some other device. In step S408, when it is determined that the received advertise signal is the advertise signal associated with the other device, the process advances to step S412. For example, even when the advertise signal for the personal device B is received by the personal device A, this advertise signal is ignored. In step S408, when it is determined that the received advertise signal is not the advertise signal associated with the other device, the process advances to step S409.

In step S409, the control circuit 302 determines whether communication with the information acquiring device 10 is necessary or not. For example, when the communication with the information acquiring device 10 is instructed by the user, it is determined that the communication with the information acquiring device 10 is necessary. In step S409, when it is determined that the communication with the information acquiring device 10 is necessary, the process advances to step S410. In step S409, when it is determined that the communication with the information acquiring device 10 is not necessary, the process returns to step S401.

In step S410, the control circuit 302 requests a communication connection to the information acquiring device 10 by transmitting the ID and password to the information acquiring device 10 for the purpose of authentication. After the communication connection is completed, the process advances to step S411. Note that the connection request in step S410 may be a process for the first communication circuit 310, or may be a process for the second communication circuit 312.

In step S411, the control circuit 302 executes communication with the information acquiring device 10. For example, the control circuit 302 requests the information acquiring device 10 to transmit various pieces of information, such as the information the acquisition of which is requested by the user. In addition, when the data, which is included in the advertise data and indicates the permission/prohibition of association between the advertise signal and other device, indicates "permission", the control circuit 302 may request the information acquiring device 10 to associate the advertise signal and other device. The communication in step S411 may be executed by using the first communication circuit 310, or may be executed by using the second communication circuit 312. After the communication, the process returns to step S401.

In step S412, the control circuit 302 determines whether communication with the information acquiring device 10 is necessary or not. For example, when the communication with the information acquiring device 10 is instructed by the user, it is determined that the communication with the information acquiring device 10 is necessary. In step S412, when it is determined that the communication with the information acquiring device 10 is necessary, the process advances to step S413. In step S412, when it is determined that the communication with the information acquiring device 10 is not necessary, the process returns to step S401.

In step S413, the control circuit 302 requests a communication connection to the information acquiring device 10 by transmitting the ID and password to the information acquiring device 10 for the purpose of authentication. After the communication connection is completed, the process advances to step S414. Note that the connection request in step S413 may be a process for the first communication circuit 310, or may be a process for the second communication circuit 312.

In step S414, the control circuit 302 executes communication with the information acquiring device 10. For example, the control circuit 302 requests the information acquiring device 10 to transmit various pieces of information, such as the information the acquisition of which is requested by the user. In addition, when the data, which is included in the advertise data and indicates the permission/prohibition of association between the advertise signal and other device, indicates "permission", the control circuit 302 may request the information acquiring device 10 to associate the advertise signal and other device. The communication in step S414 may be executed by using the first communication circuit 310, or may be executed by using the second communication circuit 312. After the communication, the process returns to step S401.

As described above, in the present modification, the content of the advertise data is varied between the personal devices. In this case, too, the advertise signal appropriate for each central is transmitted. The advertise signal can be received by a plurality of centrals. However, only a small amount of data, such as the presence/absence of transfer presetting, is included in the advertise signal. Thus, it is easy to keep the personal privacy.

In the embodiments, the part described as the "unit" or the like (section, unit, or the like) may be configured as a purpose-specific circuit or as a combination of general-purpose circuits. Where necessary, the "unit" or the like may be configured as processors such as a microprocessor and a CPU, which operate according to pre-programmed software, or may be combined with a sequencer such as an FPGA. In addition, such design is possible as to assign part or all of the controls of the unit or the like to an external device. In this case, a wired or wireless communication circuit intervenes. Communication may be executed by Bluetooth communication, Wi-Fi communication, and telephone networks. Besides, the communication may be executed by a USB, etc. A purpose-specific circuit, a general-purpose circuit and a controller may be integrally constructed as an ASIC.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device capable of executing wireless communication, comprising:
   a communication circuit configured to broadcast-transmit an advertise signal or causing the electronic device to be discovered by a plurality of other devices in wireless communication; and
   a control circuit configured to change advertise data included in the advertise signal in accordance with each of the other devices,
   wherein the control circuit is configured to change the advertise data between when the other device is a device shared by a plurality of users, and when the other device is a device for exclusive use by a single user.

2. The electronic device of claim 1, wherein the control circuit is configured to change transmission cycle of the advertise signal in accordance with each of the other devices.

3. The electronic device of claim 1, wherein the advertise signal is associated with each of the other devices by a request from the other device in response to the advertise signal, and
   the control circuit is configured to change the advertise data in accordance with the associated other device.

4. The electronic device of claim 3, wherein the advertise data includes information indicative of permission or prohibition of association between the other device and the advertise signal, and
   the control circuit is configured to associate the other device and the advertise signal by a request from the other device in response to the advertise signal, when the information indicative of the permission or the prohibition of the association is indicative of the permission.

5. The electronic device of claim 1, wherein the control circuit is configured to cause the communication circuit to transmit the advertise signal when a specified date and time is reached.

6. An electronic device capable of executing wireless communication, comprising:

a communication circuit configured to broadcast-transmit an advertise signal for causing the electronic device to be discovered by a plurality of other devices in the wireless communication; and a control circuit configured to change advertise data included in the advertise signal in accordance with each of the other devices, wherein the control circuit is configured to change the advertise data between when the other device is a device for exclusive use by a first user, and when the other device is a device for exclusive use by a second user.

7. The electronic device of claim 6, wherein the control circuit is configured to change transmission cycle of the advertise signal in accordance with each of the other devices.

8. The electronic device of claim 6, wherein the advertise signal is associated with each of the other devices by a request from the other device in response to the advertise signal, and the control circuit is configured to change the advertise data in accordance with the associate other device.

9. The electronic device of claim 8, wherein the advertise data includes information indicative of permission or prohibition of association between the other device and the advertise signal, and the control circuit is configured to associate the other device and the advertise signal by a request from the other device in response to the advertise signal, when the information indicative of the permission or the prohibition of the association is indicative of the permission.

10. The electronic device of claim 6, wherein the control circuit is configured to cause the communication circuit to transmit the advertise signal when a specified date and time is reached.

11. A communication method by an electronic device capable of executing wireless communication, comprising:

broadcast-transmitting an advertise signal for causing the electronic device to be discovered by a plurality of other devices in the wireless communication;

changing advertise data included in the advertise signal between when the other device is a device shared by a plurality of users, and when the other device is a device for exclusive use by a single user;

determining, by each of the other devices that received the advertise signal, whether communication with the electronic device is possible or not, in accordance with the advertise data; and issuing a request for the wireless communication from the other device to the electronic device, when it is determined that the communication with the electronic device is possible and when the communication with the electronic device is necessary.

12. A computer-readable non-transitory storage medium storing a communication program of an electronic device capable of executing wireless communication, the communication program causing a control circuit of the electronic device to execute:

broadcast-transmitting an advertise signal for causing the electronic device to be discovered by a plurality of other devices in the wireless communication; and changing advertise data included in the advertise signal between when the other device is a device shared by plurality of users, and when the other device is a device for exclusive use by a single user.

13. A communication method by an electronic device capable of executing wireless communication, comprising:

broadcast-transmitting an advertise signal for causing the electronic device to be discovered by a plurality of other devices in the wireless communication;

changing advertise data included in the advertise signal between when the other device is a device for exclusive use by a first user, and when the other device is a device for exclusive use by a second user;

determining, by each of the other devices that received the advertise signal, whether communication with the electronic device is possible or not, in accordance with the advertise data; and issuing a request for the wireless communication from the other device to the electronic device, when it is determined that the communication with the electronic device is possible and when the communication with the electronic device is necessary.

14. A computer-readable non-transitory storage medium storing a communication program of an electronic device capable of executing wireless communication, the communication program causing a control circuit of the electronic device to execute:

broadcast-transmitting an advertise signal for causing the electronic device to be discovered by a plurality of other devices in the wireless communication; and changing advertise data included in the advertise signal between when the other device is a device for exclusive use by a first user, and when the other device is a device for exclusive use by a second user.

* * * * *